June 19, 1962 N. F. BROWN ETAL 3,039,394
CONTROL SYSTEMS AND CONTROLLER THEREFOR
Original Filed Oct. 3, 1955 3 Sheets-Sheet 1

INVENTORS
NORMAN F. BROWN
CLIFFORD M. PETERS
ROBERT W. DINNING

BY
ATTORNEYS

INVENTORS
NORMAN F. BROWN
CLIFFORD M. PETERS
ROBERT W. DINNING

BY
ATTORNEYS 3,039,394
Patented June 19, 1962

1

3,039,394
CONTROL SYSTEMS AND CONTROLLER THEREFOR
Norman F. Brown and Clifford M. Peters, Longview, and Robert W. Dinning, Kilgore, Tex., assignors, by mesne assignments, to U.S. Industries, Inc., a corporation of Delaware
Original application Oct. 3, 1955, Ser. No. 537,970, now Patent No. 2,940,477, dated June 14, 1960. Divided and this application June 9, 1960, Ser. No. 43,970
1 Claim. (Cl. 103—52)

This invention relates to improvements in control systems and refers more particularly to systems in which time provides the basic control and which are particularly adaptable for use in controlling flow of well fluids in various manners.

Another object is to provide a controller and system as referred to in the last preceding paragraph in which the remote signal is initiated by the arrival of a free piston at a selected station throughout its travel, the free piston being of the type shown in United States Reissue Patent 23,698 and United States Patent 2,714,855.

Another object is to provide a controller for controlling flow from a well employing a free piston in which the well normally is shut in but is automatically opened for predetermined time intervals of a time duration in which the well may be automatically shut in in response to the free piston passing a predetermined position in its travel.

Another object is to provide a controller system for delivering pressure impulses of a predetermined duration at predetermined time intervals with means for interrupting either a particular impulse or successive impulses upon occurrence and the existence of a predetermined pressure condition in which the impulses will continue to be given after cessation of occurrence of such predetermined condition at their regular time intervals as though there had been no previous interruption in the timing cycle.

Another object is to provide a controller and system utilizing a pilot valve for providing an opening force, which pilot valve is controlled by a resilient means and a means for rendering the resilient means ineffective, wherein the latter means may be responsive to several conditions as well as time dependent upon which condition occurs first and independently of the others, for example, a cycle initiated by a clock timing wheel can be ended by the arrival of a free piston at the tubing head of a well, failing which, it can be ended by a fall in the gas pressure in the casing of the same well, failing which, it can be ended by the clock timing wheel on the expiration of a predetermined time; whichever condition or effect occurs first terminating the cycle.

Another object of the invention is to provide a time controlled controller system for both starting and terminating an operation which employs a safety factor in that upon stoppage of the clock in the middle of such an operation which would leave a valve open indefinitely, the operation is terminated at substantially the same time that it would be terminated by the clock had the clock not stopped in response to occurrence of some condition such as pressure change or arrival of a mechanical part at a predetermined station.

Other and further objects of the invention will appear from a consideration of the specification and the drawings.

In the drawings which form a part of the instant specification and are to be read in conjunction therewith and wherein.

2

Figure 3:
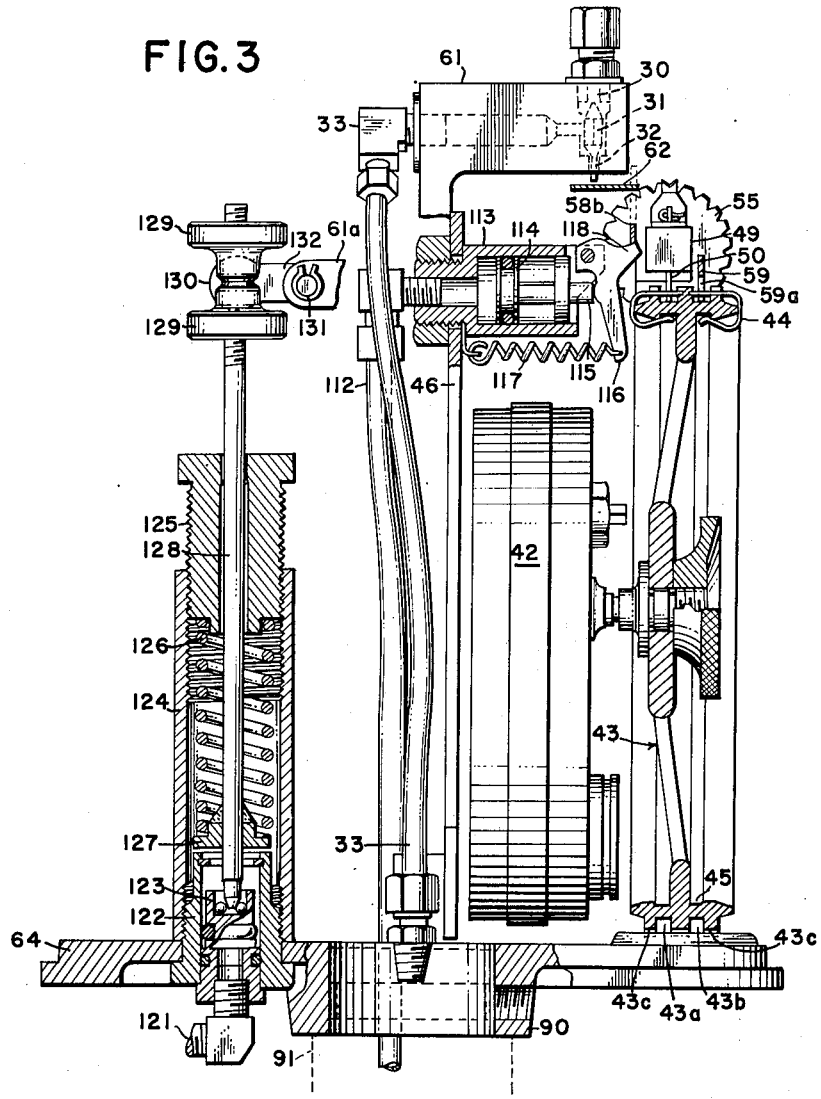
Figure 4:
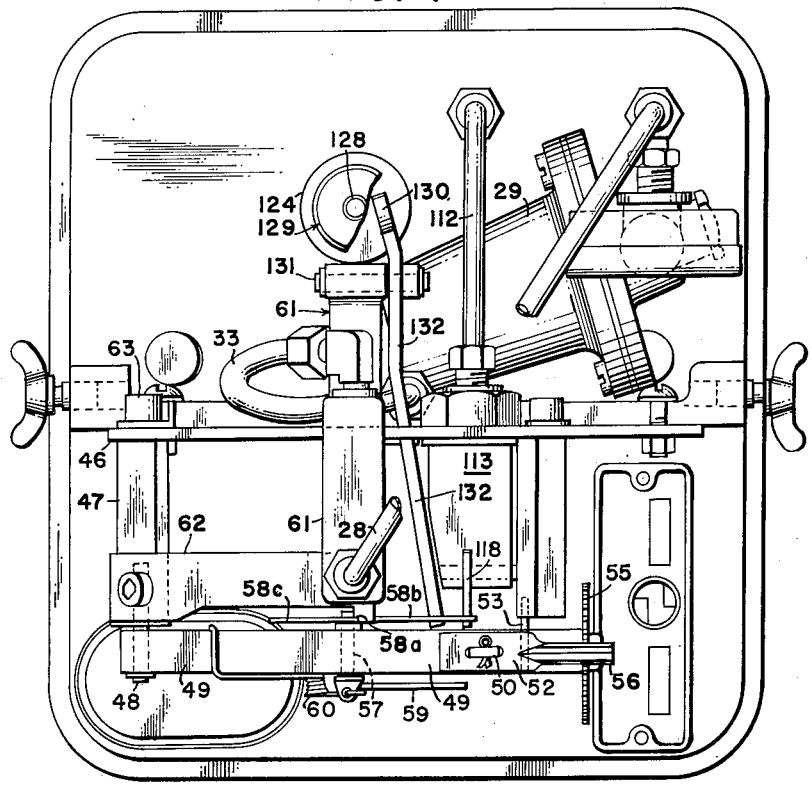

FIG. 3 is a view taken in elevation with parts shown in section of a controller equipped for tripping not only on time but also in response to pressure and a mechanical action;

FIG. 4 is a top plan view of the controller shown in FIG. 3; and

Figure 5:
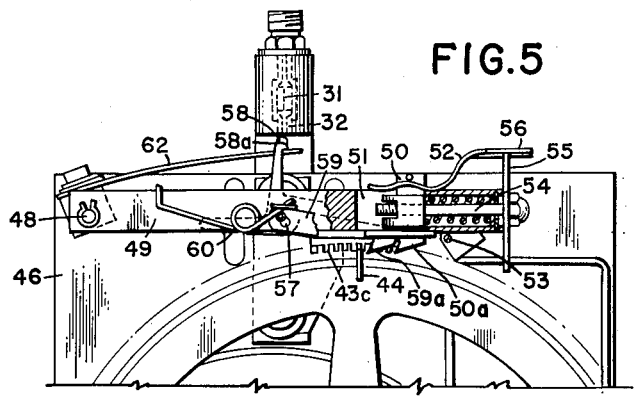

FIG. 5 is an elevational view taken at 90° from the view in FIG. 3 and illustrates in section part of the control mechanism.

Referring now to FIGS. 3, 4 and 5, a clock 42 rotates a control wheel 43 at a speed suited to the installation to be controlled. The wheel 43 has two peripheral grooves 43a and 43b, a large number of slats 43c, typically 180 or 240, conveniently divisible by 30 (days) or by 12 (hours), and shaped spring pins 44 capable of being placed in any groove and self-retaining by virtue of a light grip in the circumferential recess 45, are utilized.

An upright standard or back plate 46 carries a weight bar bracket 47 whose extension pin 48 is a pivot on which a weight bar 49 can swing in a vertical plane over the rim of wheel 43. A stop 53 limits downward swinging of the weight bar relative to the wheel. The cam 50, movable in a slot 51 in the weight bar and having all slack taken up by a blade spring 52, projects down into the wheel groove 43a and intercepts the path of any pin 44 placed in any slot 43c when the weight bar is at rest on stop 53. Rotation of the wheel 43 and pins 44 then lifts the weight bar slowly and drops it instantaneously when the pin has passed the full length of cam 50. The position of cam 50 is varied by the fine thread screw 54, typically having forty threads per inch, which is rotated by serrated disc 55. The serrated disc is held against accidental movement under influences such as vibration, by the V-shaped extension 56 of the flat blade spring 52 engaging serrations on the rim of disc 55. The disc 55 is clearly marked by divisions, typically twenty-five, so that a change of one division would change the position of cam 50 by one thousandth of an inch.

The weight bar is fitted with a latch assembly in which the transverse spindle 57 is attached to a ratchet lever 58, having a ratchet tooth 58a and at the other end to a time release lever 59 which has a cam 59a similar to the cam 50. The arrangement is such that rocking of lever 59 due to cam 59a engaging a pin 44 will cause the lever 58 to rock to release catch 58a. Cam 59a projects down into the groove 43b of wheel 43 and intercepts the path of pin 44 as the wheel 43 rotates.

Pilot valve body 61 has an inlet valve port 30 to which gas is fed by pipe 28 through a pressure regulator 29 and gas is obtained from such a source. A double-ended two-way pilot valve 31 is normally urged upwards by blade spring 62 which constitutes a resilient means. The blade spring is fixed to bracket 47 and adjusted in strength by rotating the bar 47 and locking same by screw 63. Thus, the spring 62 presses valve 31 against seat 30 closing off the supply of gas and simultaneously opening the exhaust port 32.

It is believed that the operation of this controller is apparent from the foregoing description. The pilot valve housing 61 is provided with the inlet port 30, outlet port 32 and an intermediate port connecting with pipe 33. Pilot valve 31 has two operable positions, the first closing off the inlet 30 while connecting the outlets 32 and pipe 33 so as to vent the latter. The second position of valve member 31 closes port 32 while connecting the inlet 30 with pipe 33. The pilot valve when in its raised position prevents the communication of any signal impulses or gas pressure impulses, but when allowed to fall to its lower or second position, the signal impulses are given. The pilot valve member 31 is biased toward the position for closing outlet 32 as by gravity assisted by gas pressure but a resilient means in the form of the leaf spring 62 normally overcomes the bias to hold the valve member in position to close inlet port 30.

Timed impulses are given by overcoming the spring 62 at timed intervals, whereby the valve member 31 can assume its lower position under the bias, and the impulse duration lasts until the spring 62 is released whereby it may return valve member 31 to its raised position.

The means for rendering ineffective the resilient means 62 includes the clock driven wheel, the weighted arm with its cam connection with the wheel, and the ratchet lever 58. A means is provided for rendering this means ineffective also in response to a clock driven wheel which may be the same wheel. This latter means includes the release lever 59 with its cam 59a engageable by the pins 44 for raising the release lever to thus rock ratchet lever 58 from position where it engages the leaf spring. This terminates the signal impulse upon a timed interval basis.

It will be appreciated that the clock mechanism need not be strong enough to directly provide a force for overcoming the resilient means 62 because the cam 50 has an inclined face 50a which is in engagement with the pin 44 over a prolonged period, thus providing a mechanical advantage capable of raising the arm 49 slowly to the position that lever 58 hooks over spring 62. However, when the pin 44 passes over the lefthand edge of cam face 50a, as shown in FIG. 5, the arm 49 is free to move quickly under the stored energy to quickly render ineffective the resilient means 62. Likewise, the release of the ratchet lever 58 from resilient means 62 is instantaneous to provide a snap action for returning the valve member 31 to its other position.

Figure 1:
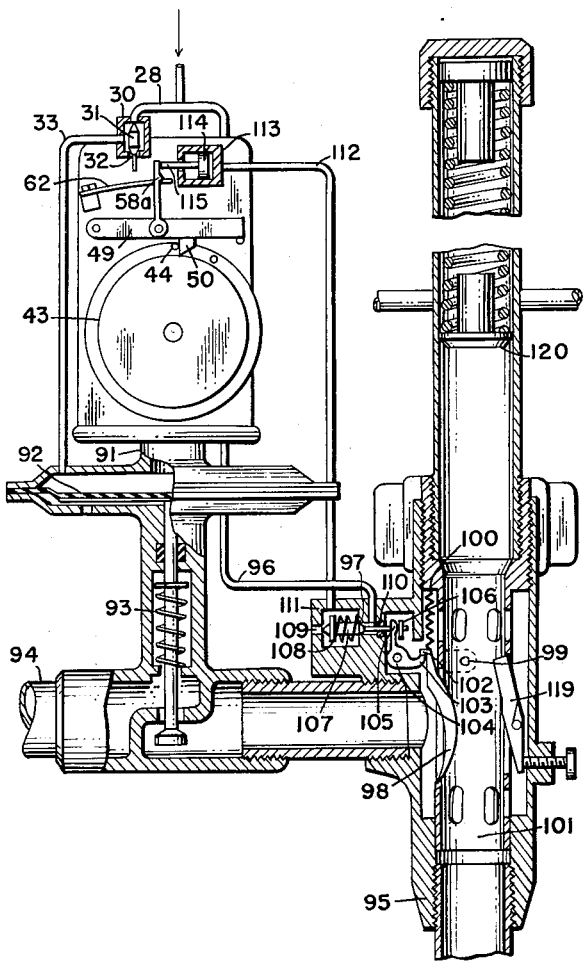
FIG. 1 illustrates this invention as applied to a well having natural flow and equipped with a free piston.
Figure 2:
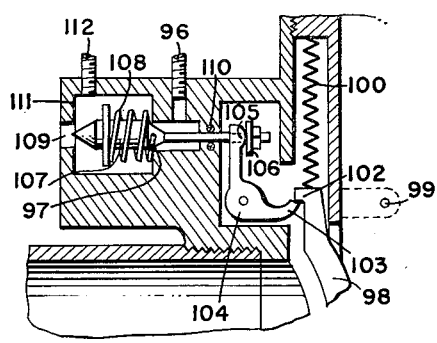
FIG. 2 illustrates on a somewhat enlarged view a trigger mechanism of a remote control for the controller of FIG. 1.

The controller shown in FIGS. 1, 2 and 3 is designed for use in the arrangement of FIG. 1. It controls a motor valve and is equipped with means other than time controlled means for limiting the duration of the signal impulse. The means for terminating the duration of the signal impulse in accordance with conditions other than time provide a safety factor as well as a factor insuring conservation of control gas and also provide for remote control of the device.

A base plate 64 has a facility 90 suitable for mounting on the top extension 91 of a conventional diaphragm motor valve such as that shown in FIG. 1.

In the case of the conventional motor valve shown in FIG. 1, gas pressure supplied to pipe 33 passes down through a hole in boss 91 to the diaphragm 92 and thus the motor valve is opened by pressure and closed by return spring 93.

In the FIGS. 3 and 4 assembly, the horizontal extensions 58c and 58b of the ratchet lever 58 are brought into use for alternative means of releasing the ratchet 58a from engagement with the spring 62.

A pin 44 across groove 43a will lift the weight bar 49 by cam 50, ratchet head 58a will be lifted up above the edge of spring 62 and spring 60 will cause its engagement and prevent accidental disengagement due to vibration. In the meantime spring 62 is holding valve 31 closed up against seat 30 so that pipe 33 and the diaphragm chamber of motor valve of FIG. 1 is exhausted to atmosphere through port 32. When pin 44 passes by the end of the inclined plane of cam 50 and the weight bar 49 drops against the stop 53, the ratchet tooth 58a pulls down the spring blade 62 clear of the end of the spindle of valve 31, allowing the latter to close port 32, open port 30, transfer pressure to pipe 33 and the diaphragm 92, opening the motor valve.

From this position any force that can disengage the ratchet head 58a from spring 62 will be sufficient to cause the reclosure of the motor valve because, while the weight bar is heavy enough to pull down the blade spring 62, the latter, when freed will give an instantaneous thrust upward on valve 31 and be strong enough to close port 30 against the pressure supplied to it, typically 25 p.s.i., with a snap action.

Thus, it will be seen, pilot valve 31 is instantaneously opened and instantaneously closed.

Method No. 1 of releasing the ratchet is by the clock on a time basis. Thus, assuming a timing wheel speed of one revolution per day, a pin 44 is placed across the groove 43b at a point which will come to the top later than the pin across the groove 43a which initiated the opening of the motor valve, then after a lapse of time, cam 59a would be lifted, rotating spindle 57 and releasing the ratchet 58a. This time delay between the opening and closing of the motor valve assuming 180 slots 43c can be varied in steps of eight minutes by moving the pin 44 from slot to slot. It can also be varied in very small steps by micrometer adjustment of the relative position of cam 50 which has a travel relative to the weight bar of more than the distance between two adjacent wheel slots. As previously mentioned, an adjustment of one division of the serrated disk 55 moves the cam 50 $\frac{1}{1000}$" which varies the time by four seconds. This is satisfactorily small for oil field usage.

Thus by time setting, the motor valve can be closed any time from less than one minute to more than 23¾ hours after the opening, variable by four second steps.

Method No. 2 of effecting a ratchet release is by the arrival at the surface in a well tube of a free piston which commenced its journey from the bottom of that well with a load of fluid above it when the motor valve of FIG. 1, mounted on the fluid flow line 94 from the tubing head of the well, was opened.

In FIG. 1 a conventional motor valve, opened by pressure on diaphragm 92 and closed by spring 93 is mounted on the flow line 94 from the tubing head flow T 95 of a well. In this type of oil well production operation, commonly called "Stop-Cocking," there is a free opening at the bottom of the well between the casing and tubing in which gas accumulates. The motor valve is usually kept closed for a time while a free piston, typically a Garrett Oil Tools, Inc. Type K-2, falls through a fluid accumulation in the tubing to the bottom. On the opening of the motor valve by the clock controlled action, the gas pressure in the tubing above the fluid is exhausted down to a low pressure and the gas in the casing at relatively higher pressure then raises the free piston to the top of the well with the load of fluid above it flowing through line 94.

If the motor valve were closed too soon all of the fluid would not be delivered and if it were closed too late, gas from the casing flowing around the bottom of and up through the tubing would be wasted and so the ideal criterion for the closing of the motor valve in wells of this type, is the arrival of the free piston at a control point, as at the top of the well. The time control may still be employed as a safety factor set sufficiently slow to assure time for the free piston to complete its travel.

The FIG. 1 assembly illustrates this method of close off. The gas pressure fed through pipe 28 to the controller is connected also by pipe 96 to port 97 of a unitized flow-T-pilot-valve assembly. In the flow T a cam 98, pivoted on a center 99, is normally maintained by a spring 100 in a position such that the curved part of its profile projects through a slot in pipe 101 to intercept the path of the free piston as it comes up the well. The cam lug 102 abuts one arm 103 of a crank lever 104 whose other arm 105 is forked to engage the head 106 of pilot valve 107. Pilot valve 107 is urged by light spring 108 to close atmospheric exhaust port 109 and open gas pressure supply port 97 but is normally held in its opposite alternate position by the superior force of spring 100 acting through lug 102, and lever 104 on the head 106 of the valve stem. The valve stem has a packing gland 110. The pressure chamber 111 is connected by pipe 112 with a cylinder 113 in the controller. This is shown in simple diagrammatic form in FIG. 3 with a piston 114 whose rod 115 is arranged to push the ratchet head 58a off the spring 62 allowing it to close controller pilot 31. This is more fully described in connection with FIGS. 3 and 4.

Referring to FIGS. 3 and 4 the cylinder 113, attached to the back plate 46, has a slotted extension in which is pivoted a lever 116 acted upon in one direction by the thrust of piston rod 115 and in the other by return spring 117. The lever head 118 is arranged to lie just under the arm 95 of the ratchet lever 58 when its head 58a is engaged with blade spring 62.

When a free piston comes up to the well head behind a fluid column which is flowing through pipe 94 and the open motor valve, it pivots cam 98 outwards against spring 100 and lifts the lug 102 away from the crank lever 104. Spring 108 then moves pilot valve 107 to close the vent port 109 and open the gas supply port 97 whereupon gas is fed to chamber 108, pipe 112, and cylinder 113 to thrust out piston 114 whose piston rod 115 pivots lever 116 whose head 118 lifts the arm 95 releasing ratchet 58a, closing port 30, venting the gas from the diaphragm 92 through atmospheric exhaust 32 and closing the motor valve.

119 is a manually controlled means of catching and holding a free piston when it is to be retrieved, and 120 is a spring buffer to cushion a free piston arrival at high velocity.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

This application is a division of our co-pending application Serial No. 537,970, now U.S. Patent No. 2,940,477.

The invention having been described, what is claimed is:

In combination an oil and gas well equipped with a well tubing and a free piston operable therein, a conduit connected to the well tubing for conducting flow therefrom, a motor valve controlling said conduit, biased toward closed position, clock driven means for supplying control gas under pressure to the motor valve to open it at predetermined time intervals, means for venting the motor valve to close it, time means for actuating the venting means at pre-selected time intervals after each initiation of control gas to the motor valve, and means responsive to the travel of the free piston, operable upon its reaching a pre-determined position within the well to actuate the means for venting the motor valve to close said conduit, whereby the conduit will be opened intermittently to flow the well for a fixed time interval unless the free piston first reaches a pre-determined position in its travel.

References Cited in the file of this patent

UNITED STATES PATENTS

| | | |
|---|---|---|
| 2,508,174 | Knox et al. | May 16, 1950 |
| 2,699,121 | Knox | Jan. 11, 1955 |
| 2,714,855 | Brown | Aug. 9, 1955 |